(12) United States Patent  (10) Patent No.: US 8,859,025 B2
Garwood  (45) Date of Patent: Oct. 14, 2014

(54) TRIPLE STREAM SEPARATION OF FAT, LEAN, AND FLUID FROM BONELESS BEEF

(75) Inventor: Anthony J. M. Garwood, Mercer Island, WA (US)

(73) Assignee: Safefresh Technologies, LLC, Mercer Island, WA (US)

( * ) Notice: Subject to any disclaimer, the term of this patent is extended or adjusted under 35 U.S.C. 154(b) by 0 days.

(21) Appl. No.: 13/563,396

(22) Filed: Jul. 31, 2012

(65) Prior Publication Data

US 2014/0037806 A1    Feb. 6, 2014

(51) Int. Cl.
| A23L 3/28 | (2006.01) |
| A23L 1/31 | (2006.01) |
| A23B 4/015 | (2006.01) |
| A23B 4/09 | (2006.01) |
| C11B 1/10 | (2006.01) |
| A23L 1/025 | (2006.01) |

(52) U.S. Cl.
CPC . *A23B 4/015* (2013.01); *A23L 1/31* (2013.01); *A23B 4/09* (2013.01); *C11B 1/10* (2013.01); *A23L 1/0252* (2013.01)
USPC ........... 426/248; 426/417; 426/424; 426/645; 426/518; 426/478; 426/495; 426/601; 426/480

(58) Field of Classification Search
CPC ........ A23B 4/015; A23B 4/09; A23L 1/0252; A23L 1/31; C11B 1/10
USPC ......... 426/248, 417, 424, 469, 472, 478, 495, 426/601, 645, 480, 518
See application file for complete search history.

(56) References Cited

U.S. PATENT DOCUMENTS

| 3,780,191 | A |  | 12/1973 | Langer |
| 5,147,672 | A |  | 9/1992 | McLachlan |
| 5,435,443 | A |  | 7/1995 | Hohenester |
| 5,552,173 | A |  | 9/1996 | Singh |
| 5,650,187 | A |  | 7/1997 | Franklin |
| 5,944,597 | A | * | 8/1999 | Singh et al. .................. 452/134 |
| 6,177,120 | B1 | * | 1/2001 | Jackeschky .................. 426/614 |
| 7,666,456 | B2 |  | 2/2010 | Garwood |
| 8,137,722 | B2 |  | 3/2012 | Garwood |
| 2007/0254074 | A1 | * | 11/2007 | Garwood .................. 426/326 |
| 2009/0214733 | A1 | * | 8/2009 | Garwood .................. 426/417 |
| 2010/0112168 | A1 |  | 5/2010 | Garwood |
| 2011/0008505 | A1 |  | 1/2011 | Garwood |
| 2012/0231148 | A1 |  | 9/2012 | Garwood |
| 2012/0276256 | A1 |  | 11/2012 | Garwood |
| 2012/0282382 | A1 |  | 11/2012 | Garwood |
| 2013/0115349 | A1 |  | 5/2013 | Garwood |

* cited by examiner

*Primary Examiner* — Drew Becker
*Assistant Examiner* — Preston Smith
(74) *Attorney, Agent, or Firm* — Christensen O'Connor Johnson Kindness PLLC

(57) ABSTRACT

A method for separating fat particles from lean particles. The method includes providing a mixture comprising a fluid, fat particles, and lean particles; introducing the mixture to an inlet of a chamber, wherein the chamber has an upper outlet and a lower outlet distal to the inlet; irradiating the mixture with UVc energy as the mixture is transferred through the chamber; allowing particles less dense than the fluid to be carried out from the chamber through the upper outlet; and allowing the particles more dense than the fluid to be carried out from the chamber through the lower outlet.

14 Claims, 2 Drawing Sheets

TRIPLE STREAM SEPARATION OF FAT, LEAN, AND FLUID FROM BONELESS BEEF

BACKGROUND

Boneless beef that is a byproduct of breaking a carcass, or boneless beef that is produced with high levels of fat in comparison to lean beef, is of relatively low value. Applicant's prior patents disclose methods for processing of such boneless beef that include separating the fat from the lean beef and that result in a higher value product. The prior patents disclose a multitude of separators or apparatus designed to separate the fat from the lean beef in a vessel by separating according to different densities of lean beef and fat.

While the prior applications disclose useful separation apparatus, continuous improvements are sought to increase efficiency or provide additional advantages.

SUMMARY

A method for separating fat particles from lean particles is disclosed. The method includes, providing a mixture comprising a fluid, fat particles, and lean particles; introducing the mixture to an inlet of a chamber, wherein the chamber has an upper outlet and a lower outlet distal to the inlet; irradiating the mixture with UVc energy as the mixture is transferred through the chamber; allowing particles less dense than the fluid to be carried out from the chamber through the upper outlet; and allowing the particles more dense than the fluid to be carried out from the chamber through the lower outlet.

The fluid may include water, or water with an acid, an alkali, or a combination.

The method may include wherein the lean particles are initially buoyant in the fluid as they enter the inlet, and are denser than the fluid when they leave the chamber.

The method may further include creating the fat particles and the lean particles by dicing beef into pieces, cooling the pieces, and applying pressure to the pieces such that fat matter breaks off from lean matter, resulting in the fat particles and the lean particles.

The chamber may be an elongated, horizontally disposed vessel, and UVc emitting elements are placed inside the vessel.

The method may include wherein the temperature of the fluid as the mixture enters the inlet to the chamber is higher than the temperature of the lean particles.

The method may include wherein the lean particles undergo a density increase as the particles travel through the chamber.

The method may include wherein the fluid comprises water, and carbonic acid.

The method may further include passing the fluid with fat particles through a second chamber at an elevation higher than the first chamber.

The method may further include irradiating the fluid with fat particles when passing through the second chamber.

The method may include wherein the second chamber is an elongated, horizontally disposed vessel, and UVc emitting elements are placed inside the vessel.

The method may further include passing the fluid with lean particles through a third chamber at an elevation lower than the first chamber.

The method may further include irradiating the fluid with lean particles when passing through the second chamber.

The method may include wherein the second chamber is an elongated, horizontally disposed vessel, and UVc emitting elements are placed inside the vessel.

BRIEF DESCRIPTION OF THE DRAWING

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
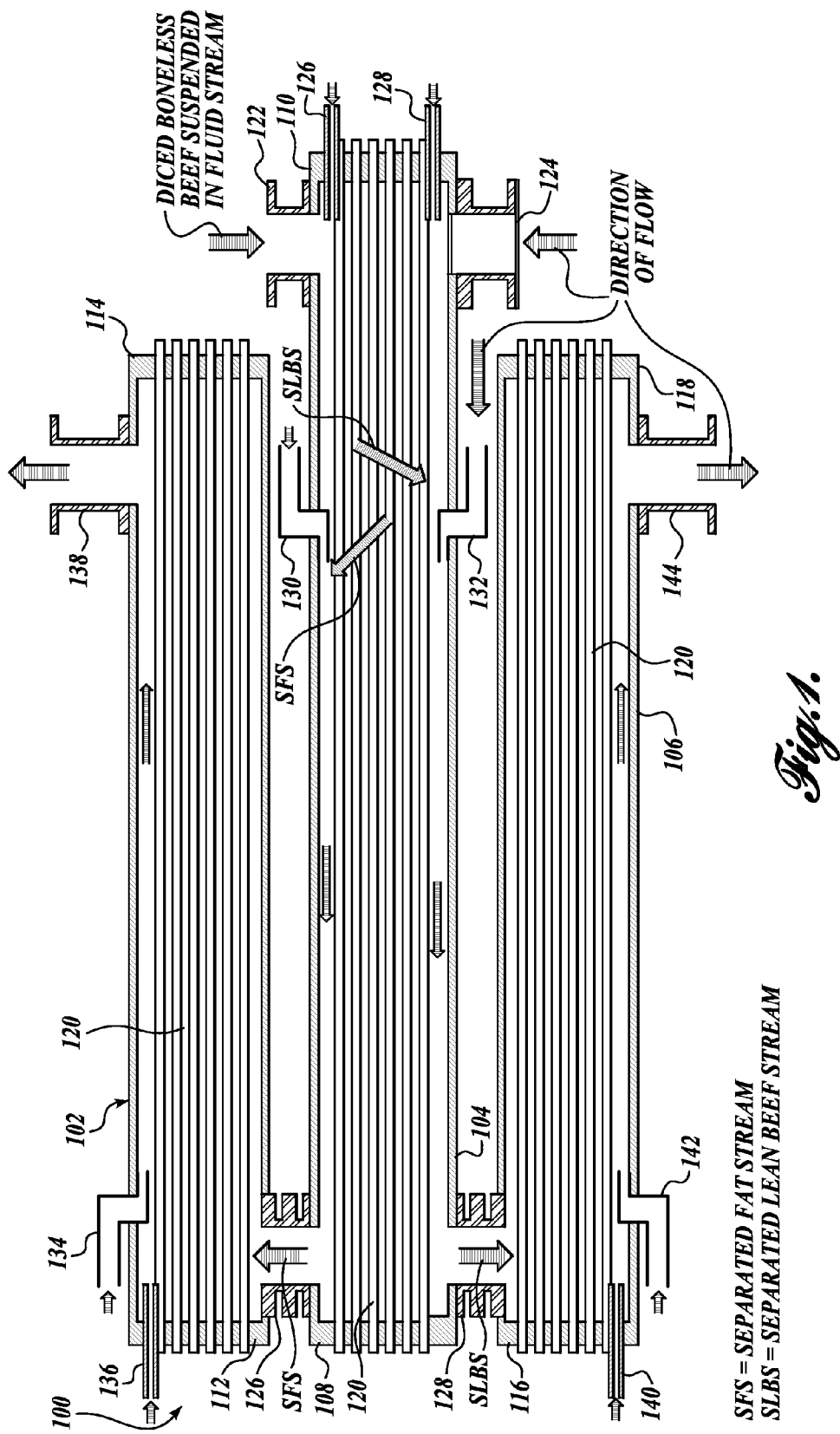
FIG. 1 is a diagrammatical illustration of apparatus for the separation of fat from lean beef, after chilling and dicing from a single stream of boneless beef.

Referring to FIG. 1, an illustration of an apparatus intended for separating fat and lean from a fluidized stream of diced and chilled boneless beef is illustrated. The illustrated apparatus is used in a process of separating fat from lean beef, both being derived from boneless beef. Prior to reaching the apparatus 100, the boneless beef has been processed to cut and dice the beef into small pieces. The small pieces of beef are then chilled to a temperature that allows the fat to be broken away, such as through compression, resulting in fat particles and lean beef particles, which may still contain fat.

The apparatus 100 includes three horizontally disposed chambers 102, 104, and 106. Each of the chambers may be an independent vessel, or the chambers may be combined into a single vessel if enclosed within an outer shell, for example.

The apparatus 100 includes a first, middle chamber 104. The second, upper chamber 102 is placed higher in elevation in comparison to the middle chamber 104. The third, lower chamber 106 is placed lower in elevation than the middle chamber 104 and the upper chamber 102. The chambers 102, 104, and 106 are at different heights so as to take advantage of the respective buoyancies of the fat and lean beef particles, such that gravity allows separation to take place of the lighter, less dense particles compared with the heavier, more dense particles.

The middle chamber 104 can generally be described as a cylinder having an outer shell. The outer shell may be made of a polished stainless steel tube, for example. An advantage of using polished stainless steel tube is to equip the stainless steel tube with UVc-producing elements placed longitudinally within the middle chamber 104. The middle chamber 104 includes two end caps 108 and 110, respectively. The end caps 108 and 110 seal the respective ends of the middle chamber 104. The end caps 108 and 110 may also be used to support UVc-emitting elements 120. The UVc-producing elements 120 extend from the end cap 108 to the end cap 110. The UVc-producing elements 120 are described in more detail below. The inner space of the middle chamber 104 is essentially open, except for the UVc-producing elements 120. The open space is accessed through one or more inlets 122 and 124 positioned on one end of the middle chamber 104. The one or more inlets, such as 122 and 124, may be placed circumferentially on the middle chamber 104 tube. The end plate 110 may also support one or more fluid jets 126 and 128. Additionally or alternatively, fluid inlets may also be positioned along the middle chamber 104 tube, such as at locations 130 and 132. The fluid jets are placed close to or in proximity to the inlets 122 and 124. The fluid jets inject fluid in a direction substantially parallel to the direction of flow through the middle chamber 104.

The middle chamber 104 includes a top side outlet 126 and a bottom side outlet 128. The outlets 126 and 128 are disposed on the middle chamber 104 tube at the end opposite to the inlets 122 and 124. The top side outlet 126 is disposed at a top side of the middle chamber 104 tube, such that fluid at or near the top side of the middle chamber tube 104 is transferred out from the top side outlet 126 to the upper chamber 102. Conversely, the bottom side outlet 128 is disposed at a lower side of the middle chamber 104 tube. The bottom side outlet 128 allows the transfer of fluid from the bottom section of the middle chamber 104 to the lower chamber 106. The upper outlet 126 allows the transfer of fluid from the middle chamber 104 to the upper chamber 102.

The upper chamber 102 is generally described as an elongated cylinder. The upper chamber includes a first end cap 112 and a second end cap 114 disposed on opposite ends of the upper chamber 102 tube. The end caps 112 and 114 seal the respective ends of the upper chamber 102. The end caps 112 and 114 may also be used to support UVc-emitting elements 120. The UVc-producing elements 120 extend from the end cap 112 to the end cap 114. The UVc-producing elements 120 are described in more detail below. The inner space of the upper chamber 102 is essentially open, except for the UVc-producing elements 120. The outlet 126 from the middle chamber 104 is the inlet to the upper chamber 102, which enters through the lower side of the upper chamber 102. The upper chamber 102 includes one or more inlets for fluid jets, for example, inlets 134 and 136, are placed on the upper side of the tube, either at the end cap 136, or circumferentially on the middle chamber 102 tube. The fluid jets 134 and 136 are placed close to or in proximity to the fluid inlet 126. The fluid jets 134 and 136 inject fluid in a direction substantially parallel to the direction of flow through the upper chamber 102. The upper chamber 102 includes at least one outlet 138. The outlet 138 is located on the upper side of the upper chamber 102 and opposite from the inlet 126.

The lower chamber 106 is generally described as an elongated cylinder. The lower chamber 106 includes a first end cap 116 and a second end cap 118 disposed on opposite ends of the lower chamber 106 tube. The end caps 116 and 118 seal the respective ends of the lower chamber 106. The end caps 116 and 118 may also be used to support UVc-emitting elements 120. The UVc-producing elements 120 extend from the end cap 116 to the end cap 118. The UVc-producing elements 120 are described in more detail below. The inner space of the lower chamber 106 is essentially open, except for the UVc-producing elements 120. The bottom outlet 128 from the middle chamber 104 is the inlet to the lower chamber 106, which enters through the upper side of the lower chamber 106. The lower chamber 106 includes one or more inlets for fluid jets, for example, inlets 140 and 142, are placed on the lower side of the tube, either at the end cap 140, or circumferentially on the middle chamber 102 tube. The fluid jets 140 and 142 are placed close to or in proximity to the fluid inlet 128. The fluid jets 140 and 142 inject fluid in a direction substantially parallel to the direction of flow through the lower chamber 106. The lower chamber 106 includes at least one outlet 144. The outlet 144 is located on the lower side of the lower chamber 106 and opposite from the inlet 128.

A method of using the separation apparatus 100 is described. Fluid enters the middle chamber 104 from the inlets 122 and 124. The fluid can include water comprising one or more acids and one/or more alkaline agents. A suitable acid can include carbonic acid, which is made from the combination of water with carbon dioxide. It should be noted that fluid can be the fluid injected through any one of the middle, upper, and lower chambers. The fluid that enters through the inlets 122, and 124, however, contains particles of lean beef and particles of fat. The particles are produced from boneless beef that has been diced, chilled and compressed to liberate fat from the diced beef. The beef pieces are chilled to a frozen or near-frozen condition, and then crushed so as to liberate fat from boneless beef pieces. Crushing under a frozen or nearly frozen condition results in the liberation of fat particles from the boneless beef. Fluid is subsequently added to the particles such that the particles are initially buoyant in the fluid. The particles of fat and lean may also be fluidized in the fluid, such that the particles are generally separated from other particles and allowed to rotate in the fluid, exposing all cut surfaces to the UVc energy. The fluid may at a temperature higher than the temperature of the particles. This temperature induces any water in the particles to thaw. As the water thaws, the density of the particles decreases, as ice is less dense than water. Furthermore, since lean beef comprises more water than fat, the difference in density between frozen and nonfrozen particles is greater for the lean beef particles. Thus, the lean particles may initially be buoyant in the fluid. However, as the lean particles travel in the fluid, the particles thaw, and experience an increase in density, which results in the lean particles being more dense than the fluid, and therefore sink to the bottom. Alternatively, the lean beef particles can be denser than the fluid, with or without the presence of frozen water.

The fluid carrying the fat particles and the lean beef particles enters the middle chamber 104 from one end thereof and is transferred generally in the horizontal direction. The speed with which the fluid, and thus the particles, travel in the middle chamber 104 is such that the less dense particles, comprising fat, may tend to float or rise in the fluid as the fluid travels in the horizontal direction along the middle chamber 104. The denser particles, comprising mostly lean beef, tend to sink within the fluid as the fluid travels horizontally along the middle chamber 104. Additionally, fluid may be injected through one or more injection sites, such as 126 and 128, from the end cap 110, or side injection inlets 130 or 132. After having been transferred the length of the middle chamber 104, fluid together with the particles which are lighter (less dense) exit the middle chamber through outlet 126 positioned on the upper side of the middle chamber 104, while fluid together with particles comprising lean beef that are denser than the fluid flow out of the middle chamber 104 from the bottom outlet 128. The fat particles enter the upper chamber 102 from the bottom side thereof. Additional fluid may be injected into the upper chamber 102 from injection sites 136 or 134. Thereafter, fluid and particles are transferred in the upper chamber 102 substantially horizontally. Thereafter, all the fluid and the fat particles then exit through the outlet 138 at the upper side of the upper chamber 102. Meanwhile, fluid together with the denser particles comprising lean beef, enter the bottom chamber 106 from a top site thereof. Additionally, fluid may be injected into the bottom chamber 106 through injection sites 140 or 142. Thereafter, fluid and particles are transferred in the bottom chamber 106 substantially horizontally along the chamber 106. Fluid, together with the lean particles, exits the bottom chamber 106 from the outlet 144 positioned on a lower side of the lower chamber 106.

Thereafter, the fluid with fat particles exiting through outlet 138 may be further processed to separate the fluid. Once separated from the fluid, the fat particles may be emulsified, such as be passing through a high shear producing device, such that the fat is rendered into an "oily" material with solids.

The solids can be separated via centrifuge and the oil is pasteurized. The oil may then be food grade, and reintroduced into products.

The fluid with lean beef particles exiting through outlet 144 may be further processed to separate the fluid. Once separated from the fluid, the lean beef particles may be sold as product, or otherwise used in the preparation of food products.

The process for the separation of fat from a source of boneless beef also provides for pathogen deactivation. The process takes beef comprising both lean and fat and produces at least two products—one high in fat and the other high in lean. The process may be used for concentrating the lean beef from a supply of beef high in fat. Additionally, the process may be used to produce two product streams. A first product stream is lean beef with a percent of fat lower than the incoming supply. A second product stream is fat. Once separated, the fat can be combined with the lean beef to produce lean beef of a predetermined fat content, or the fat may be used in the production of biodiesel. However, a lean beef product may be produced with a predetermined fat content without the need to further add fat.

Figure 2:
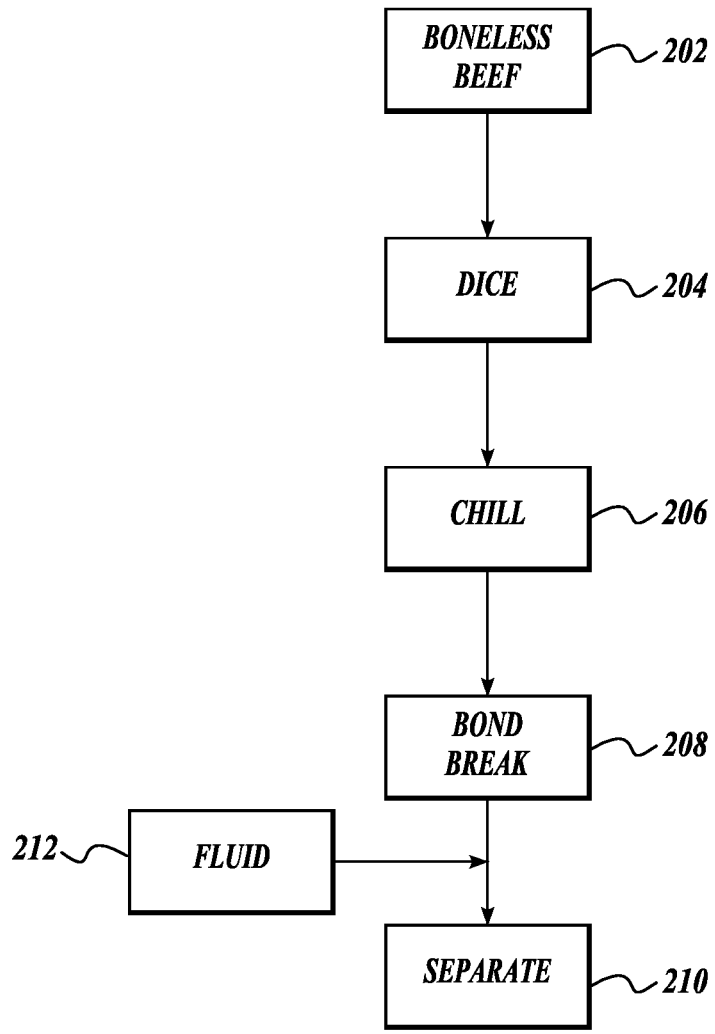
FIG. 2 is a flow diagram of a method for the separation of fat and lean.

Referring to FIG. 2, a method is illustrated for separation of fat, lean and fluid. The fat, and the lean, is provided in the form of small particles that are produced from a source of beef, such as boneless beef that initially starts out having the fat, and lean, block 202.

In block 204, this step creates beef pieces by cutting the beef in slicing or dicing equipment using sharp knives to provide 1" or 2" sized "cubes." The dicing equipment is designed to slice and dice the beef and reduce beef to a particle size preferably about 1 inch in cross section by 2 inches or less. While not limiting, the particles are reduced in size to approximately not more than about 1 inch wide and 2 inches long strips or 2 inch cubes. The individual particles of diced beef may still contain an amount of fat and an amount of lean.

The method in which the beef pieces are diced, rather than ground, may have advantages. For example, conventional grinding may not provide beef (or meat) pieces having clean cut surfaces and causes emulsification of a significant proportion of the beef passed through the grinder. Pathogens can, in this way, be protected from the lethal effects of UVc by being encapsulated in emulsified beef when the beef is ground prior to treatment. However, by dicing, the fluid with the beef pieces suspended therein allows rotation of the beef pieces so as to cause exposure of all the cut surfaces of the beef pieces to the UVc radiation.

After dicing, and in block 206, the beef pieces are chilled in individual quick freezing equipment, such as by passing through a tunnel freezer. The tunnel freezer may use carbon dioxide as the chilling medium. The input temperature of the beef pieces to the tunnel may be about 32° F. to 40° F., but preferably about 32° F. The temperature of the beef before the tunnel freezer may be controlled, in general, by adjusting the temperature of the room in which the beef is being diced. Owing to the differences of heat transfer between fat and lean in each beef piece and respective amounts of water in lean versus fat matter, the chilling tunnel results in different temperatures of fat and lean within each beef particle.

The temperature of the individual pieces that exit the chilling tunnel is not uniform throughout the pieces. Because of the different heat transfer rates of fat and lean as well as the different percentages of water within lean and fat, the temperature of the lean matter may be higher than the temperature of the fat matter within each piece. The temperature reduction is carried out to result in lean matter that remains flexible due to the cohesive properties of muscle tissue, while the fat matter is cooled such that the fat matter becomes brittle and friable. Because the lean contains greater amounts of water than fat, the water is frozen or partially frozen.

In one embodiment, flooding the tunnel with carbon dioxide gas displacing what would otherwise be air is advantageous. The use of carbon dioxide is to displace air (and therefore atmospheric oxygen), thereby inhibiting the formation of oxymyoglobin from the deoxymyoglobin exposed at the cut lean surfaces of each dice or beef particle.

The temperature of the quickly frozen beef pieces when exiting the tunnel is controlled such that lean matter, comprising substantially muscle striations, may freeze the water and all natural fluids. Water represents about 70% of lean matter and thus the freezing and expansion of water when frozen contributes a significant increase in volume with a corresponding decrease in density of the lean matter. The beef pieces after being chilled may still comprise some lean beef matter and some fat matter. The beef pieces are in a solid phase, but in such a way that the physical characteristics and properties of the lean matter is pliable and "rubbery" in texture, while the fat matter is friable such that it fractures when subjected to compressive and twisting actions and may crumble readily into small particles and be freed from the lean matter. The temperature to which the beef pieces are reduced needs to alter the physical condition of the beef pieces so as to facilitate the flexing of the muscle striations of the lean matter without causing it to fracture and break into smaller pieces, while simultaneously rendering the fat matter friable such that it may fracture, crumble, and break into smaller separate particles. In this way, the friable fat having broken away from the lean when it is flexed, crushed, bent, or twisted, thereby reduces the fat matter into small separated particles. Hence, these are referred to herein as fat particles. The remaining particles are relatively larger comprising mostly lean matter (because they are generally not broken into small particles). Hence, these are referred to herein as lean or lean beef particles. The change in physical breakdown of the diced beef pieces into two types of particles is caused by lowering the temperature thereof followed by physical disruption of the bond that fixes the fat and lean matter together in an attached state, and results in a size difference between the larger lean particles compared to smaller fat particles.

Following rapid chilling of the diced beef pieces, the temperature (at the surface) of the diced beef should be such that the lean matter in the beef particles is greater than 26° F. (preferably such that the water is frozen but the lean matter remains flexible), and the fat matter should be greater than 0° F. In one embodiment, it has been found that by reducing the temperature of the beef particles with fat in a chilling tunnel, for example, to a range of between less than 29° F. and above 26° F., the process described above may facilitate separation by providing friable fat fractures permitting the fat to crumble into small fat particles, leaving the lean matter as larger lean particles.

After chilling, the temperature of the fat (at its surface) is lower than the temperature of the lean in each particle. In one embodiment, the surface temperature of the fat matter is lower (approximately 5° F.) than the surface temperature of the lean matter, which is shown to be about 29° F., immediately following discharge from the freezer. The temperature at the surface of fat matter may be at about 5° F. or less and up to 10° F. or more such that it can be friable and crumble upon application of pressure, while the temperature of the lean matter may be 16° F. to about 34° F., or alternatively below 29° F., which makes the lean matter flexible and not frozen into a "rock-hard" condition immediately after removal from the chilling.

The individual pieces of beef containing both fat and lean matter are exposed to the chiller on the order of minutes, generally, between 2 and 3 minutes to create friable fat matter prone to crumble under a crushing force, whereas the lean matter remains pliable, flexible, and not prone to crumble under a similar crushing force. The temperatures may then begin to converge to equilibrium; therefore, it is useful to process the particles of beef in the bond breaking device before the fat is no longer friable and easy to crumble.

The stream of temperature reduced beef pieces may then be (without storing in containers or otherwise that could allow temperature equilibration of the fat and the lean matter or on an extended conveyor) transferred to a bond breaking device, block 208. A bond breaking device is any device that can apply pressure to the beef pieces to flex or bend by distortion, and to partially crush the beef pieces. In one embodiment, a bond breaking device may include a pair (two) of parallel rollers manufactured from any suitable stainless steel such as SS316 or SS304 grades, but wherein the beef pieces are not completely flattened as would occur if placed on a hard surface and rolled upon with a very heavy roller. This bond breaking compression process is intended to cause breakage of the friable fat matter into smaller particles of, in the majority of instances, approximately 100% fatty adipose tissue (fat), and smaller than the lean matter which remains in most cases intact but without any more than about 10% fat, or less. The fat in the beef pieces may "crumble", fracture, and break into small particles and separate from the lean matter in a continuous stream of what becomes small (smaller than before transfer through the crushing process) fat particles and lean particles that still comprise some fat, but are approximately more than 90% lean beef.

A suitable bond breaking device may comprise at least one or more pairs of horizontally disposed and opposed rollers, arranged so that one pair is above the other, such that the stream of beef pieces are spread out across the full width of a conveyor. The beef pieces would then be dropped in a waterfall effect between the upper pair of rollers which clamp the pieces and flex so as they are transferred between the clamping rolls without crushing and in this way cause the friable fat matter attached to any flexible lean matter to break away in small particles. After processing between the upper pair of rollers, the stream of beef pieces drops between the second pair of similarly arranged rollers to ensure processing of all pieces before buoyancy separation in the apparatus 100 described above.

Following the bond breaking device, the beef pieces, once a combination of lean and fat matter, are now smaller particles of predominantly all fat particles and predominantly all lean particles owing to the breaking of the fat matter from the lean matter. The lean particles and the fat particles are next separated, in block 210, using a separator 100, as the one described in association with FIG. 1. Separation may be done in batches or continuously. For example, the lean particles and the fat particles are accumulated in a hopper until a sufficient amount has been collected to provide for the next separation batch in the separation equipment.

Also, following compression, the fat particles and lean particles are blended with a selected fluid, block 212. In one embodiment, the mass or volume ratio of frozen beef particles to fluid should be between 1:1 and 1:10. However, the ratio of chilled beef to fluid can be such that when the suspension of beef particles is exposed to UVc in a conduit there is sufficient space between particles to allow UVc direct line of sight contact over the entire surfaces of the lean and fat particles. Enough fluid is provided so as to enable the suspended lean particles, and fat particles, and sufficient fluid to facilitate suspension of the lean and fat particles and facilitate rotation of the particles suspended in the fluid.

In addition to decontamination, separation of the fat particles from the lean (having some fat) particles can be done by way of buoyancy separation in a fluid that has a density lower than that of the lean particles when the water in the lean particles is not frozen. This is because during chilling, water in the lean particles may become frozen and expand, which correspondingly decreases the density of the water-containing lean beef particles. In the disclosed process, chilled lean particles containing frozen water may float in the fluid when initially combined with the fluid, which has advantages, but, as the lean particles travel in the fluid, temperature equilibration occurs and the water in the frozen lean particles thaws, thus increasing the density and making separation from the fat particles easier which remain buoyant. The period during which the water remains frozen so that lean particles are less dense than fluid can be advantageously used during decontamination of the particles within the UVc devices. Separation may also be conducted with a fluid that has a density greater than that of the fat particles. Separation may also be conducted with a fluid that has a density in the range between the fat particles and the lean particles. The fluid may be added after bond breaking. The fluid can include water, or water with carbon dioxide, which results in the production of carbonic acid. Fluids may include distilled or de-ionized, RO, temperature controlled water, water, or aqueous solutions of inorganic acids, such as hydrochloric and/or hypochlorous acids, or sulfuric acid or carbonic acid, or aqueous solutions of organic acids such as ascorbic, acetic or lactic acids or others, or, alternatively, aqueous salt solutions comprising water and sodium chlorite or sodium chloride to increase density and to provide an anti-microbial effect when the sodium chlorite solution laden beef particles are immersed in low pH carbonic acid, ascorbic acid, or other suitable acid. Fluids can also include compressed gases, such as nitrogen, or carbon dioxide at a pressure sufficient to maintain the carbon dioxide as a liquid, semi-liquid, and/or as a dense fluid, such as super critical phase carbon dioxide, to maintain the carbon dioxide at a desired specific gravity, such as between about 70 lbs/cu. ft. to about 25 lbs/cu. ft. but in a transparent and fluid phase condition. In one embodiment, the carbon dioxide can be at a pressure of about 300 psig to about 450 psig, which is the pressure range at which carbon dioxide is a liquid from about 0° F. to about 24° F. Additionally, the liquid carbon dioxide may be passed over frozen water (ice) or otherwise combined with water to produce carbonic acid. In one embodiment, the temperature of the fluid should be not less than about 40° F. and not greater than about 60° F., but most preferably at about 50° F., before being mixed with the beef particles. The fluids just described may also be injected through any one of the jets of the middle 104, upper 102, and lower 106 chambers.

In one embodiment, the temperature of the fluid may be above the temperatures required for bond breaking discussed above. When the fluid is first mixed with the lean and fat particles, the particles including the lean particles, may preferably float and be suspended at the uppermost space available in the fluid and just below a surface of the fluid or suspended within the fluid. Initially, the lean particles being less dense than the fluid is advantageous to allow their decontamination, as the lean particles (and also the fat particles) may be suspended in the fluid and may not settle to the bottom of conduits or vessels. As the temperature of the fluid and fat and lean particles begins to equilibrate, which involves the initial lower temperature of the lean particles increasing, corresponding with the decreasing temperature of the fluid, the buoyancy of the lean particles may start to "fail." Eventually, the lean particles sink toward the base of the fluid leaving the fat particles floating at the fluid surface or uppermost available space in the fluid. An increase in the density of the lean particles is seen as the lean and water thaw, which reduces the volume of lean particles and correspondingly increase in density. Fat having a lower content of water does not experience as great an increase in density due to water thawing.

Before the lean particles and fat particles have reached equilibrium with the fluid, any bone chips that may be present may sink when mixed together with the fluid, thereby providing a convenient means of separating bone chips first, which will most preferably be arranged to occur immediately after blending the lean and fat particles with the fluid and before temperature equilibration of the particles or when the lean particle temperature has increased so as to thaw the lean/water content of the lean matter upon which shrinkage of the lean may occur causing it to sink in the fluid. The fat particles, frozen or not, may remain floating at the fluid surface. By lowering the fluid temperature relative to the temperature of the lean particles, complete thawing and temperature equilibration may be delayed, and, accordingly, the lean particles may remain suspended for a longer period, and this can assist with UVc pathogen deactivation. However, while the lean particles are described as comprising frozen water initially, in other embodiments, the lean particles may be nonfrozen at the initial contact with the fluid. In still other embodiments, the fluid may initially be less dense than the lean particles, regardless whether they are frozen or not. Furthermore, in other embodiments, the fluid temperature need not be above the temperatures of the lean and/or fat particles.

The lean and fat particles suspended in the fluid are at a suitable mass or volume ratio of fluid to particles in the range of 1:1 to 5:1, or 10:1 to 1:10 by weight. Before temperature equilibrium is reached, and the lean particles sink, the lean and fat particles can be decontaminated, such as by treating with exposure to UVc light, which is lethal to pathogens when the exposure is sufficient. The suspension of frozen (or nonfrozen) lean and fat particles in sufficient fluid can be transferred at a steady rate through the enclosed/sealed internally polished (preferably stainless steel) chambers 102, 104, and 106 within which a plurality of elongated, tubular profiled, UVc light emitting elements 120 are mounted in parallel with the enclosing stainless steel tubes. As the temperature of the mixture steadily equilibrates, the outer surface of the lean and fat particles thaws, and, if pathogens are present, the single celled organisms may be at the surface of the beef particles or suspended in the fluid, but, in any event, at locations readily accessible to the direct "line of sight" of the UVc light emitting elements 120 given that the particles revolve while suspended in the fluid while passing through the middle chamber 104. By the time the lean particles reach the end of the middle chamber 104, the lean particles have thawed and sunk to the bottom of the middle chamber 104, and are carried with fluid out through outlet 128 into the lower chamber 106. Nevertheless, after separation into lighter, less dense particles in the upper chamber 102, and the heavier, denser particles in the lower chamber 106, there is further exposure to UVc energy by the UVc emitting elements 120 in these chambers as well. UVc is lethal to such pathogens as E. Coli 0157:H7 and Salmonella and such pathogen contamination can be deactivated by adequate exposure to UVc. The particles suspended in the fluid revolve randomly as the mixture is transferred through the middle 104, upper 102, and lower 106 chambers containing the UVc emitting elements 120. Pathogens are quickly deactivated when exposed to the UVc emitting elements 120, particularly when the UVc wavelength has been selected from either 100 nanometers to 300 nanometers or, more particularly, in the immediate range of the effective germicidal wavelength of 285 nanometers; or 200 nanometers to 300 nanometers wavelength or in the immediate germicidal wavelength of 185 nanometers.

The following indicates the wavelength in nanometers (nm) for UVa, UVb, and UVc:

UVa—420 nm-320 nm;
UVb—320 nm to 285 nm;
UVc—285 nm to 100 nm.

Most preferably the UVc wavelength of the UVc light source to which the above-referenced particles may be exposed may be in the ranges of 250 nm to 100 nm or 150 nm to 100 nm.

The fluids used, such as water, are preferably transparent to the wavelength of the energy produced by the UVc light emitting elements 120. Additionally, the fluid should remain clear and distinctly separated from the fat and lean particles, without absorbing any organic component such as blood or any other separated food item such as, for example, fat particles or, alternatively, what is commonly known in the meat processing industry as "bone dust" that could otherwise reduce the transparency of the fluid by becoming "milky," which would inhibit the UVc anti-microbial effectiveness. The particles are preferably not densely packed, and more preferably, the particles can be fluidized. This may occur because the density of the lean particles can still be less than the density of the fluid at least during the initial entry into the middle chamber 104. The middle chamber 104 could be designed to be of sufficient length to allow initial fluidization at the entrance to the middle chamber 104, and still allow for adequate separation of the lean particles, thereafter. The lean and fat particles quickly separate as temperature equilibration occurs in the middle chamber 104, causing the density of lean to increase causing the fat and lean solids to diverge as they are carried with the flow through the middle chamber 104. The fat matter remains buoyant, carried by the fluid at a higher elevation than the lean matter and the lean particles fall to the lowermost section of the conduit through which they are still propelled by the flow of fluid.

The particles may tumble and rotate randomly so that all surfaces, and especially the un-cut and "older" surfaces of the particles, are exposed to the energy being produced by the UVc emitting elements. Preferably, the fluid is transparent to and allows the passage of the particular wavelength energy without much attenuation. UVc emitting elements 120 include a UVc generator inside of a UVc transparent tube, the length of both may correspond with the length of the chambers 102, 104, and 106. Direct energy produced by the UVc emitting elements is allowed to penetrate the walls of the transparent tube and directly strike the surfaces of the particles.

The fluid can be clean, potable water or other liquids or a combination of liquids with agents. Liquids may include water, or liquid carbon dioxide, or both. The liquids may further include acids, either organic or inorganic, and alkaline agents. Acids include, but are not limited to carbonic acid (water and carbon dioxide), lactic acid, ascorbic acid, acetic acid, citric acid, peracetic acid also known as acid ($CH_3CO_3H$). Alkalinity of the liquid may be raised by adding an alkali substance, such as ammonia, ammonium hydroxide, sodium hydroxide, potassium hydroxide, calcium hydroxide, tri-sodium phosphate, and any other suitable alkali. Additives such as sodium chloride, sodium chlorite, and sodium hydroxide may be added which can be followed by addition of a suitable acid (to provide acidified sodium chlorite).

Minimizing the period of direct exposure of the chilled beef particles to the fluid in which the particles are suspended is desirable to avoid excessive loss of micronutrients, salt, sodium chloride, or plasma which can leach from the beef particles into the fluid.

The elimination of free oxygen gas from the input stream so as to prevent the possibility of ozone (O3), which can readily cause taste quality deterioration by causing rancidity of the fats, may be possible.

Boneless beef, when infected with Pathogens, such as *E. Coli* 0157:H7, may generally comprise a fat component which will likely include a predominant proportion of the total pathogen population while the lean component will likely comprise a lower pathogen population. This occurs because pathogen contamination generally occurs due to contact with any vector of pathogen contamination by the outer surface making contact therewith. The outer surface of a beef carcass is generally substantially covered with a fat layer hence the fat component of boneless beef and trim will often comprise the major proportion of any pathogen contamination contained with a given quantity of boneless beef. Separating the fat component from the lean component can, therefore, provide a means of dividing the pathogen population with a greater proportion carried with the fat component and less with the lean part. The fat stream includes protein of significant value, even after separation from the lean component and fat with proteins can be heated to higher temperatures than the lean can be such as above pasteurization temperature of 160° F. and higher. However, the lean component cannot be heated without causing unacceptable changes in color and composition. Therefore, the proteins contained in the fat component can be separated and then recombined with the lean component without affecting the finished high lean content product. Furthermore, when 30's (XF's) or 50's boneless beef are separated into two streams of: 1) a fat and beef proteins component; plus, 2) lean beef of say 90% or 93% lean content, an opportunity to subject each stream to different pathogen deactivation treatments is available. Most preferably, the fat stream (with proteins) can be pasteurized by elevating the temperature of the stream to above a pasteurization temperature of greater than 160° F. while the heat sensitive lean stream can be most preferably treated to reduce pathogen populations in super-critical carbon dioxide and according to the method described in the US Patent Application Publication No. 2010/0075002, to undetectable levels while the predominantly fat stream (and any proteins) can be pasteurized thermally by increasing its temperature to greater than 160° F. or greater than 190° F. Accordingly, after separation of the lean component from the fat component, followed by separation of the lean stream from the fluid with which it (and the fat stream) was combined prior to separation of fat from lean, the lean component can be immersed in super critical carbon dioxide according to a treatment described in the referenced patent applications. Such a pathogen deactivation process, as disclosed for example, in US Patent Application Publication No. 2010/0075002, entitled TREATMENT TO REDUCE MICROORGANISMS WITH CARBON DIOXIDE BY MULTIPLE PRESSURE OSCILLATIONS, which is herein incorporated with this patent application for all purposes, can effectively reduce pathogen populations to undetectable levels without affecting the appearance of the lean components. Separately, the fat stream, which can contain substantial quantities of proteins, can be homogenized and then pasteurized by heating to an elevated temperature of, say greater than 190° F. or at least above 160° F. or higher such as 200° F. or more which may render all pathogens inactive. The heat pasteurized stream of fat and proteins is then centrifuged to separate the liquid fat (tallow) from the proteins and any remaining water. The proteins and water can then be recombined with the lean stream without any deleterious effect on appearance of the fresh lean beef.

UVc emitting elements 120 include a UVc generator, or light, enclosed within a UVc transparent tube being a 1 (one) inch diameter fused quartz tube. Each of UVc emitting elements 120 can have a fused quartz tube on the exterior, which holds a UVc light in the interior thereof. The UVc lights (also tubes) are enclosed in fused quartz tubes with an air space between the light tube and the fused quartz tube. The air space insulates the light tube from the direct chilling effects of the chilled suspension fluid. While air is used in one embodiment, the space between the UVc light and the interior of the fused quartz tube may also include other gases, either essentially pure, or as a mixture, such as nitrogen, carbon dioxide, hydrochlorofluorocarbons (HCFCs), hydrofluorocarbons (HFCs), and the like. The UVc lights may use low pressure mercury vapor to generate the UVc radiation. In particular, a wavelength in the 240 to 280 nanometer range can be used. In one embodiment, the wavelength for disinfection can be about 260 nm.

Deflectors may be arranged in and around the interior space of chambers 102, 104, and 106 to cause rotation of the beef particles so as to cause exposure of all surfaces of the beef particles to the UVc radiation, and deflect the solids to inhibit contact with the quartz tubes so as to prevent smearing of fat onto the warm fused quartz tubes or cause other damage and/or breakage. For example, deflectors, such as thin fins can be placed in a spiral configuration on the inside of the surface of the chambers. The inner surface of the stainless steel chamber tubes is polished to reflect energy toward the center.

The heating effect of UVc lights can be significant. For example, a single device (enclosed tube) can use 23×>60 inch UV lights at up to about 190 watts per light, which represents 3.6 kW of electrical power consumed per device. With three devices arranged in series, the electrical power consumed during operation can be 11.0 kW for 3× "tubes."

The projected area of a light source, assuming a single >60-inch long, 190 Watts UV light located within a one-inch diameter fused quartz tube, is approximately 60 inches×1 inch (about 60.0 sq. inches). If the UVc light bulbs are not enclosed in fused quartz tubes and the UV light bulb has a diameter of about 0.625 inches, the cooling effect of the fluid would inhibit generation of UVc.

No molds, viruses, bacteria or micro-organisms are thought to survive when exposed to sufficient UVc light and the UVc device should be constructed to facilitate the delivery of 40 mJ/cm$^2$.

In one embodiment, the space between the fused quartz tubes and the UVc light can be immersed with nitrogen gas transferred in and out via an inlet and outlet. The nitrogen or other cooling media can be used in sufficient volume to cool and maintain a suitable temperature. The lethal or bactericidal effectiveness of the UVc light is enhanced when the distance between the UVc light source and the external surfaces of each particle, carried by the fluid, is minimized, and this can be achieved by reducing the depth of the transparent quartz tube or the thickness across the tube.

The electrophoresis effects of short wavelength light (UVc) causes damage to the DNA of bacteria, thereby rendering the bacteria non-viable. An effective bactericidal UVc light wavelength has been demonstrated to be in the range of 187 nanometers, however, the conditions required to enable this UV wavelength to contact the bacteria carried on the food surfaces can be challenging in a food mass production apparatus. Provided herein is a method and apparatus wherein the short wavelength bactericidal benefits of UV light can be applied in mass processing of, in particular, beef particles.

The space between the UVc light and the interior of the fused quartz tubes may comprise a vacuum or dry nitrogen gas filled space. In one embodiment, UVc of about 285 nanometers wavelength is suitable. Water cannot be in direct contact with the UVc light's glass, for example, low pressure, high temperature mercury vapor lamps, nor indeed can the organic matter itself be in contact with the UVc light given the high temperature conditions required to generate UVc light. It is therefore useful to provide materials that are transparent to the selected UVc light wavelength, between the UVc light source and the treated matter. Materials that have been used to provide UV light transparent barriers include certain gases such as nitrogen, water, PMMA (Poly-Methyl-Meth-Acrylate), or acrylic and fused quartz glass; however, these materials generally limit the use of UV light to wavelengths at about 285 nm. A suitable material is synthetic UV grade quartz glass or UV grade fused silica which allows 80% penetration of UVc 185 nm wavelength.

Quartz glass tubes can be manufactured from fused silica having a thickness of about 10 mm so as to allow UVc of wavelength 160 nm to pass through. It should be noted that the temperature of the fluid can be maintained at about 40 degrees F. or less, such that a film of ice can form over the beef particles in one instance having a thickness that does not inhibit the transfer of UV light therethrough or, alternatively, the temperature of the fluid in contact with the beef particles causes thawing only at the surface of the beef particles. In this way, UV light of wave length 160 nm or in another instance 285 nm generated by UV lights can penetrate the fused silica walls of tubes. The chilling and transfer of beef particles in the way described causes a continuous revolving/rotating movement of the beef particles so as to ensure that all surfaces are exposed to the UV source. In one embodiment, multiple UV sources are arranged in close proximity to the outer surface of any conduit carrying lean and fat particles, wherein alternate UV sources are provided. For example, a UV source is firstly a UV generating source of about 160 nm wavelength and the alternate UV source is a UV generating source of about 285 nm wavelength.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for separating fat particles from lean particles, comprising:
    providing diced beef pieces, wherein the diced beef pieces comprise fat and lean;
    lowering the temperature of the diced beef pieces to a first reduced temperature for the fat at which the fat is friable while simultaneously achieving a second reduced temperature for the lean at which the lean is flexible;
    crushing the beef pieces to liberate the fat without fracturing the lean and creating fat particles and lean particles;
    combining the fat particles and the lean particles with a fluid to provide a mixture;
    introducing the mixture to an inlet of a chamber, wherein the chamber has an upper outlet and a lower outlet distal to the inlet;
    irradiating the mixture with UVc energy as the mixture is transferred through the chamber;
    allowing particles less dense than the fluid to be carried out from the chamber through the upper outlet; and
    allowing the particles more dense than the fluid to be carried out from the chamber through the lower outlet.

2. The method of claim 1, wherein the fluid comprises water, or water with an acid, an alkali, or a combination.

3. The method of claim 1, wherein the lean particles are initially buoyant in the fluid as they enter the inlet, and are denser than the fluid when they leave the chamber.

4. The method of claim 1, wherein the chamber is an elongated, horizontally disposed vessel, and UVc emitting elements are placed inside the vessel.

5. The method of claim 1, wherein the temperature of the fluid as the mixture enters the inlet to the chamber is higher than the temperature of the lean particles.

6. The method of claim 1, wherein the lean particles undergo a density increase as the particles travel through the chamber.

7. The method of claim 1, wherein the fluid comprises water, and carbonic acid.

8. The method of claim 1, further comprising passing the fluid with fat particles through a second chamber at an elevation higher than the first chamber.

9. The method of claim 8, further comprising irradiating the fluid with fat particles when passing through the second chamber.

10. The method of claim 8, wherein the second chamber is an elongated, horizontally disposed vessel, and UVc emitting elements are placed inside the vessel.

11. The method of claim 1, further comprising passing the fluid with lean particles through a third chamber at an elevation lower than the first chamber.

12. The method of claim 11, further comprising irradiating the fluid with lean particles when passing through the second chamber.

13. The method of claim 11, wherein the second chamber is an elongated, horizontally disposed vessel, and UVc emitting elements are placed inside the vessel.

14. The method of claim 1, wherein, before crushing, the temperature of the lean is 16° F. to 34° F., and the temperature of the fat is lower than the temperature of the lean.

* * * * *